United States Patent [19]

Paulo

[11] Patent Number: 5,163,782
[45] Date of Patent: Nov. 17, 1992

[54] SUBSEA CONNECTION SYSTEM AND ACTIVE CONNECTOR UTILIZED IN SAID SYSTEM

[75] Inventor: Cezar A. S. Paulo, Rio de Janeiro, Brazil

[73] Assignee: Petroleo Brasileiro S.A. - Petrobras, Rio de Janeiro, Brazil

[21] Appl. No.: 775,467

[22] Filed: Oct. 15, 1991

[30] Foreign Application Priority Data

Oct. 12, 1990 [BR] Brazil .................. 9005132

[51] Int. Cl.⁵ .................... F16L 1/12; E02D 5/62
[52] U.S. Cl. .................... 405/169; 405/224.3; 166/360
[58] Field of Search ........ 405/169, 224, 224.2, 405/224.3, 224.4; 166/339, 341, 343, 360

[56] References Cited

U.S. PATENT DOCUMENTS

| | | | |
|---|---|---|---|
| 4,615,646 | 10/1986 | Langner | 405/169 |
| 4,820,083 | 4/1989 | Hall | 405/169 |
| 4,832,124 | 5/1989 | Davis | 166/360 X |
| 4,867,605 | 9/1989 | Myers et al. | 405/169 |
| 4,881,850 | 11/1989 | Abreo, Jr. | 405/169 |
| 4,899,822 | 2/1990 | Daeschler et al. | 405/169 X |
| 4,899,823 | 2/1990 | Cobb et al. | 166/360 X |

*Primary Examiner*—Randolph A. Reese
*Assistant Examiner*—J. Russell McBee
*Attorney, Agent, or Firm*—Sughrue, Mion, Zinn, Macpeak & Seas

[57] ABSTRACT

A subsea connection system includes a rigid vertical main connector (23) and an active (mobile) lateral connector (24) coupled to a subsea module (20) for connection, respectively, to a main mandrel (25) and to a lateral mandrel (26) rigidly fixed to the structures (27, 28) set at the seabottom. The active lateral connector (24) utilized in this system is provided internally with a locking and sealing set which is supported by pins (39) held in the orifices (40) of an intermediate jacket (41) which, in turn, is supported by pins (45) circumferentially offset at 90° in relation to the orifices (40).

9 Claims, 11 Drawing Sheets

SUBSEA CONNECTION SYSTEM AND ACTIVE CONNECTOR UTILIZED IN SAID SYSTEM

FIELD OF THE INVENTION

This invention refers to a subsea connection system intended for the installation of subsea equipment or modules which must be locked to two mandrels of two structures set at the seabottom, so as to establish a structural and fluid-flow continuity between these two structures.

BACKGROUND OF THE INVENTION

In the subsea connection systems so far utilized, intended for the installation of subsea equipment or modules which must be locked to two mandrels of two structures set at the sea-bottom, a subsea module is installed by a tool supported by a vessel by means of a column, in which the subsea module is provided with two vertical connectors for locking to the mandrels rigidly integrated to the structures which support it, set at the sea-bottom. These types of systems, however, since they utilize the provision of vertical connectors rigidly fastened to a structure, present as a major disadvantage, at the time of the connecting operation, the inability to compensate for the linear and angular deviations of positioning which occur between the two mandrels, rendering such simultaneous connection in most cases unsuccessful.

SUMMARY OF THE INVENTION

With the purpose of solving the problems listed above, a subsea connection system is provided, according to this invention, which includes two vertical connectors coupled to a subsea module for connection to two mandrels, being one main connector rigid and one lateral connector active (mobile), provided with mobility, which renders it capable of absorbing such positioning deviations, thus ensuring the effectiveness of the connecting operation.

This mobility reached by the subsea connection system of this invention is due to the provision of an active lateral connector provided internally with a locking and sealing set which is supported by pins held in the orifices of an intermediate jacket which, on its turn, is held up by pins arranged with a 90° difference in relation to the orifices previously mentioned.

DETAILED DESCRIPTION OF THE PREFERRED EMBODIMENTS

Figure 1:
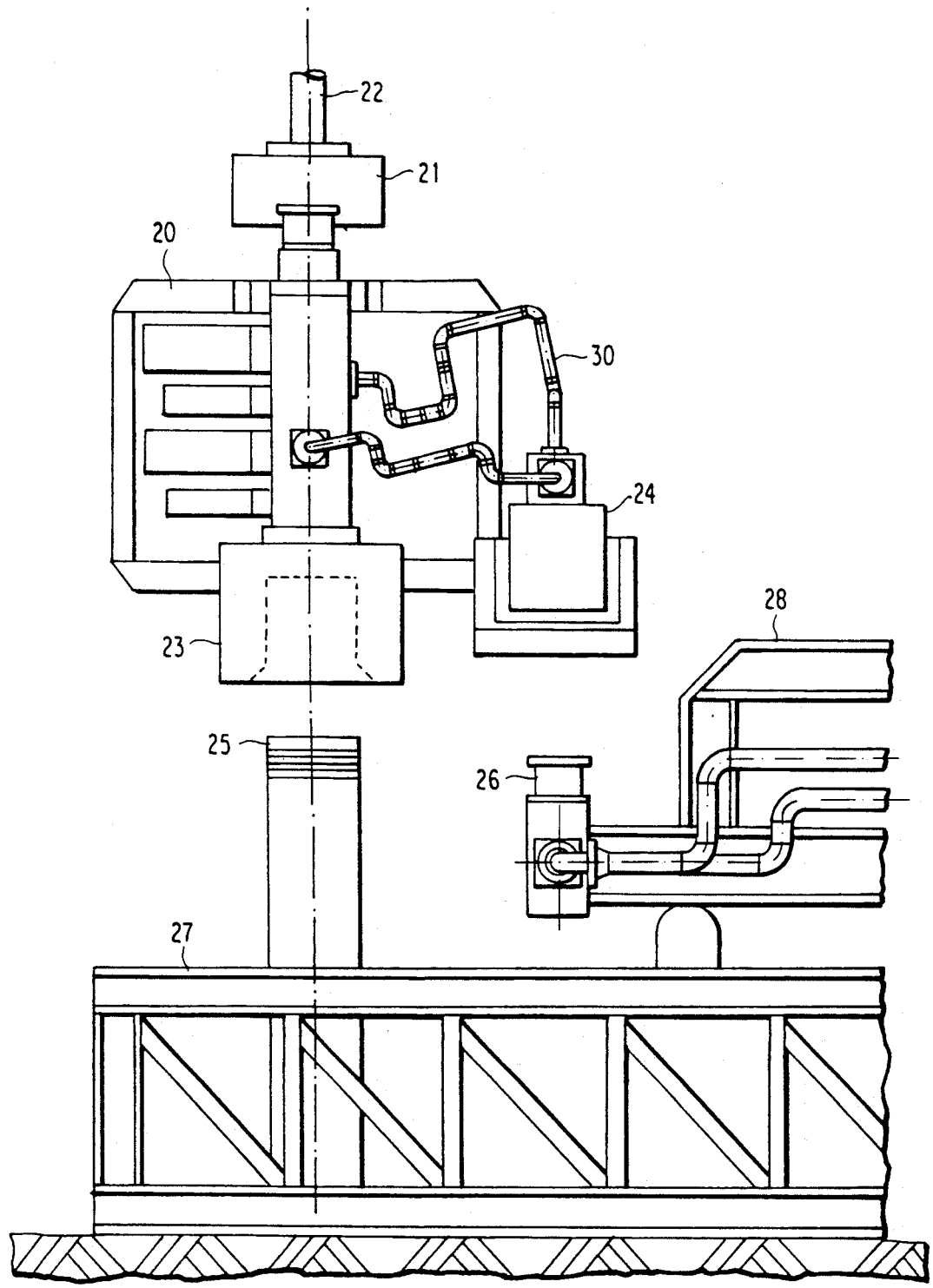
FIG. 1 is a side elevational view of a subsea connection system of this invention, showing the subsea module suspended by the installation tool.
Figure 2:
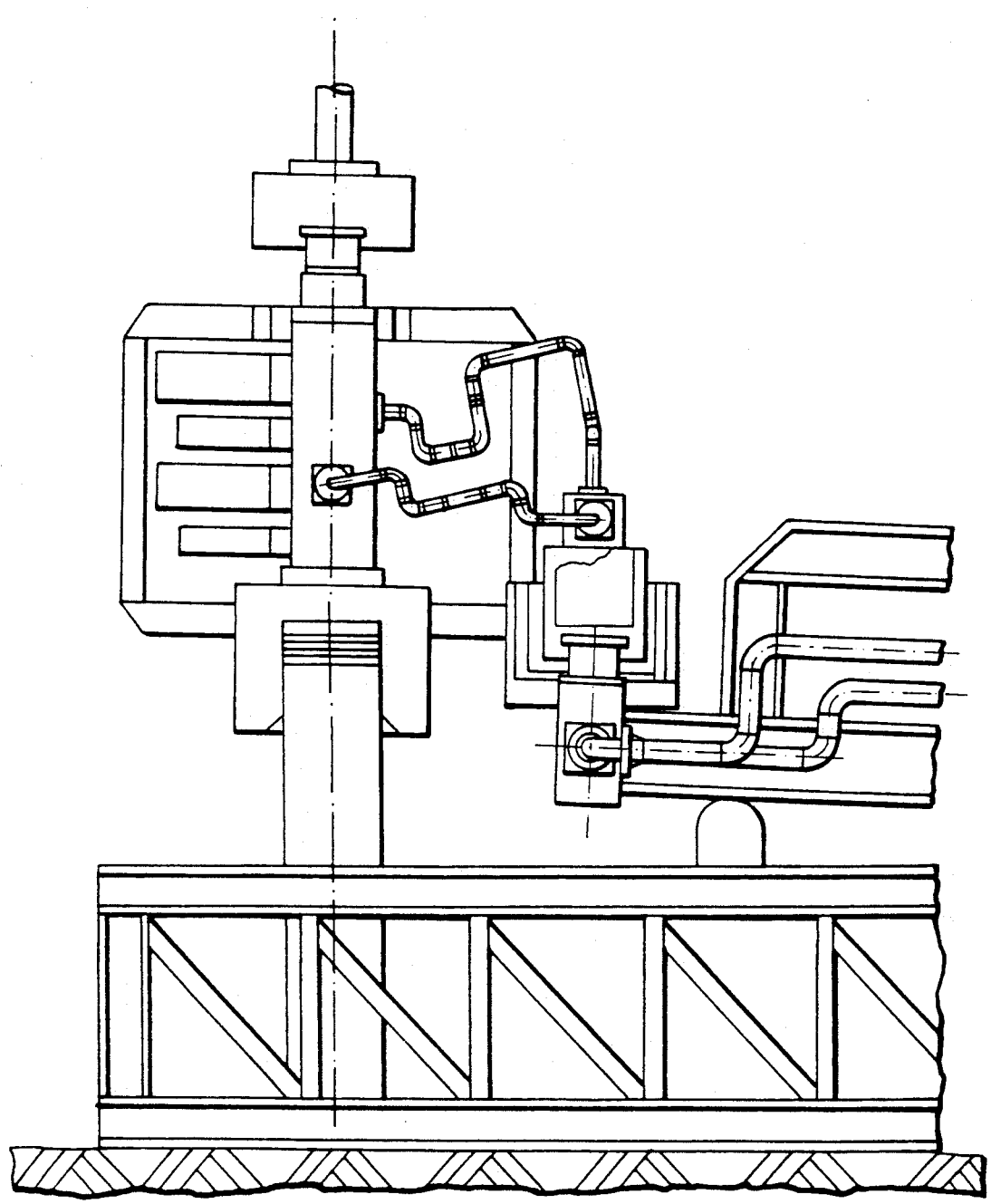
FIG. 2 is similar side elevational view of the subsea connection system, showing the subsea module set and locked in the main mandrel, with the active lateral connector retracted and unlocked.
Figure 3:
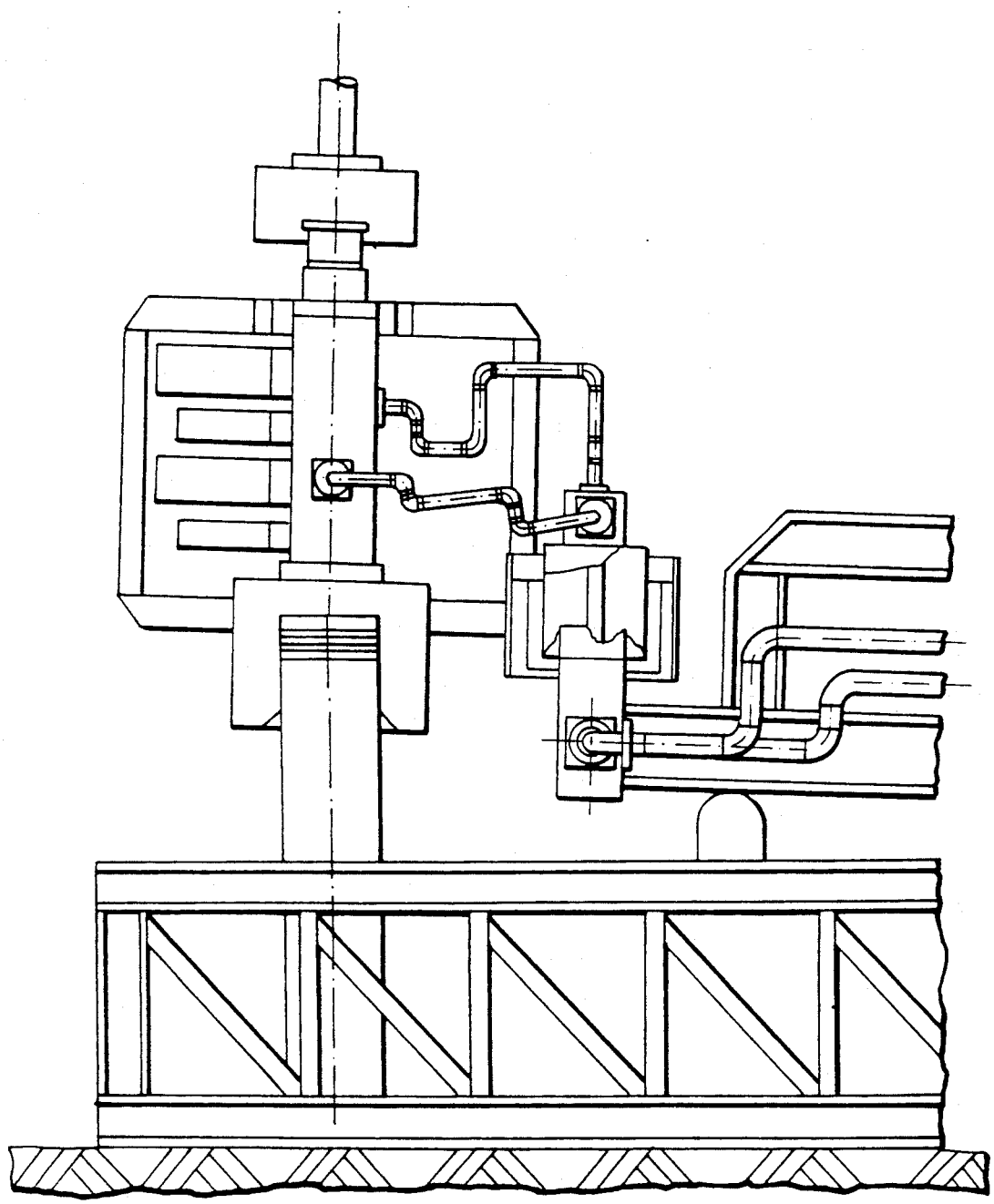
FIG. 3 is a side elevational view of the subsea connection system, showing the subsea module set and locked in the main mandrel with the active lateral connector extended, positioned and locked to the lateral mandrel.
Figure 4:
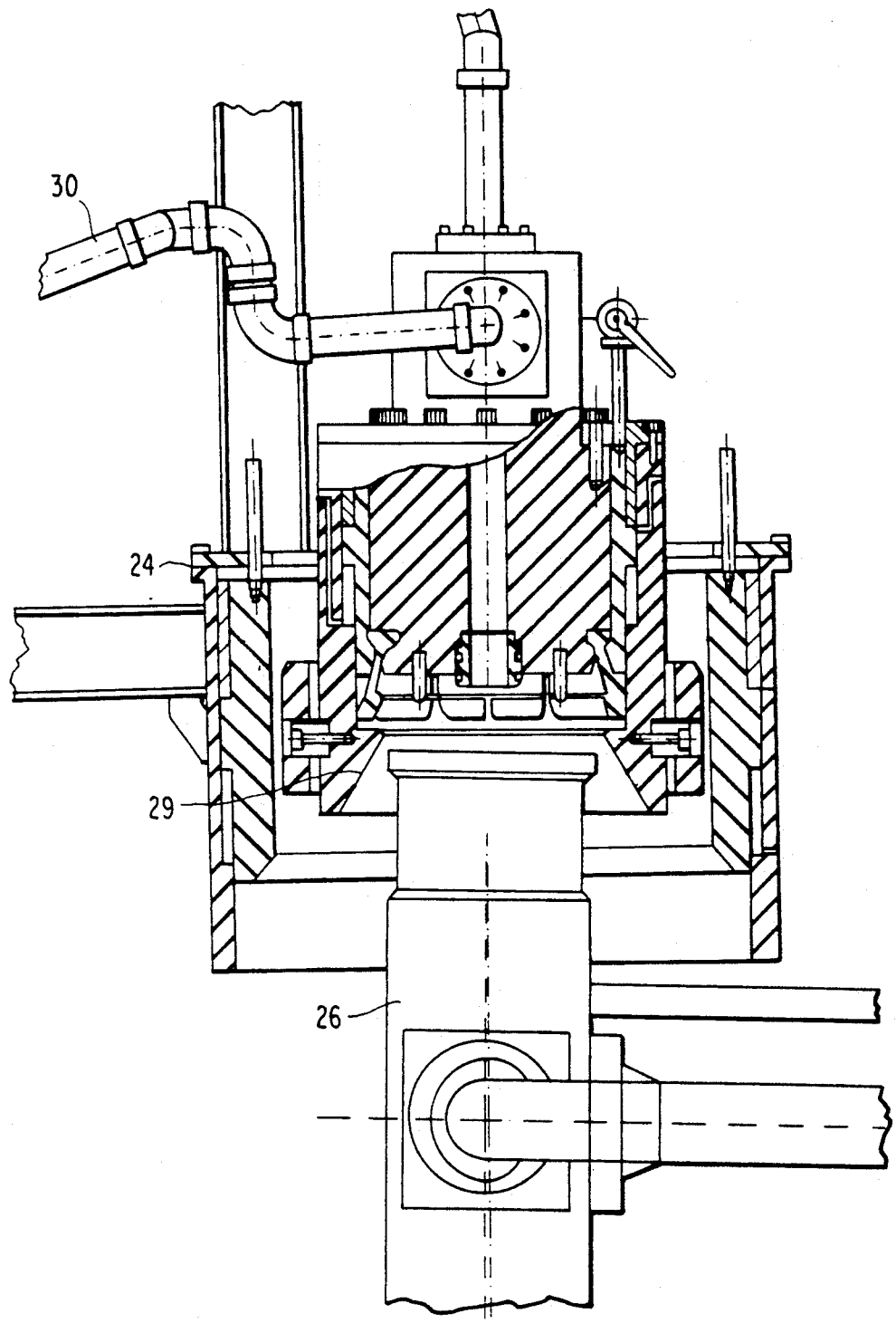
FIGS. 4 through 6 are enlarged sectional views of the active lateral connector utilized in the system of this invention, showing details of coupling of the active lateral connector to the lateral mandrel which is laterally displaced and inclined in relation to the main mandrel.
Figure 5:
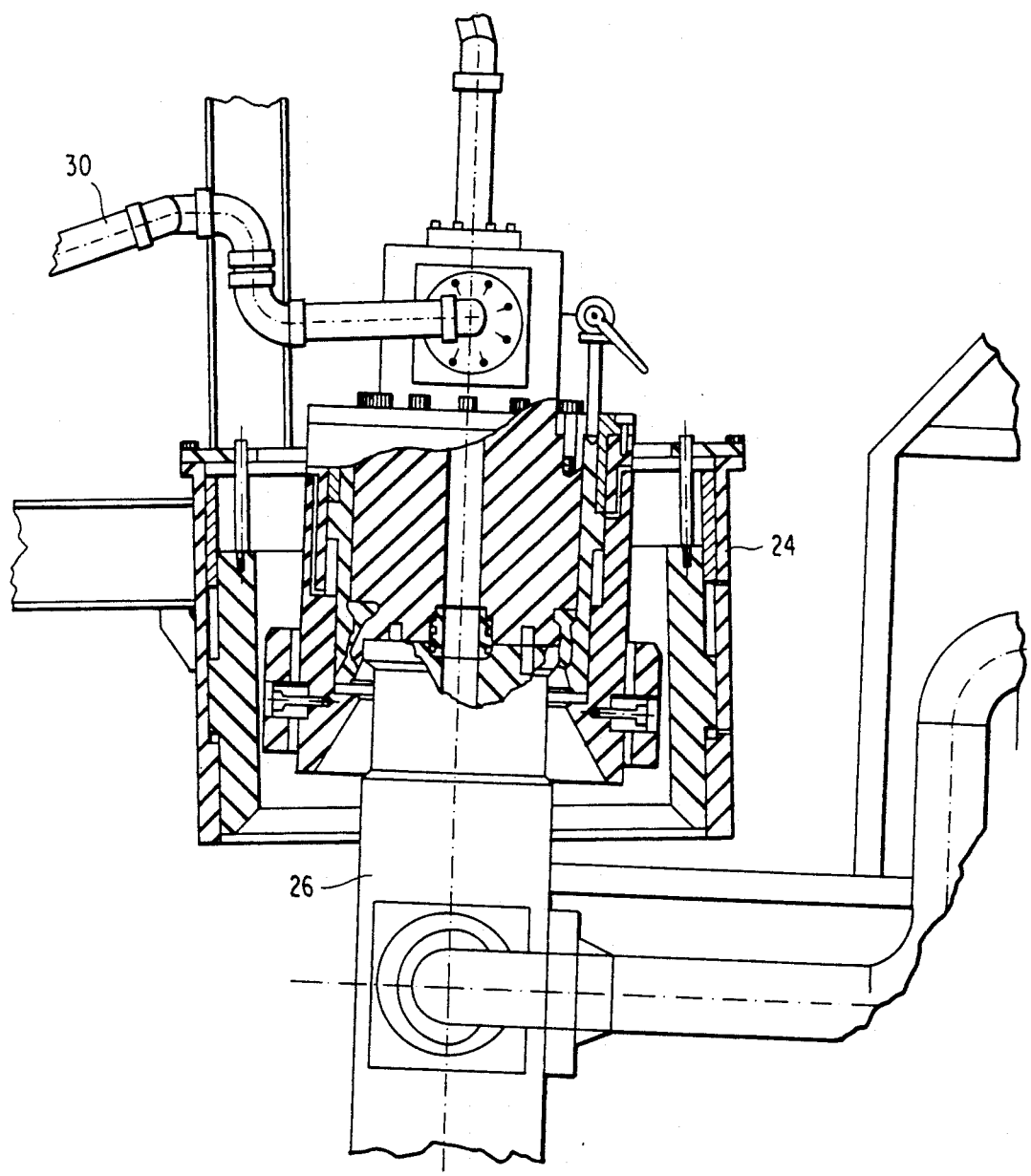
Figure 6:
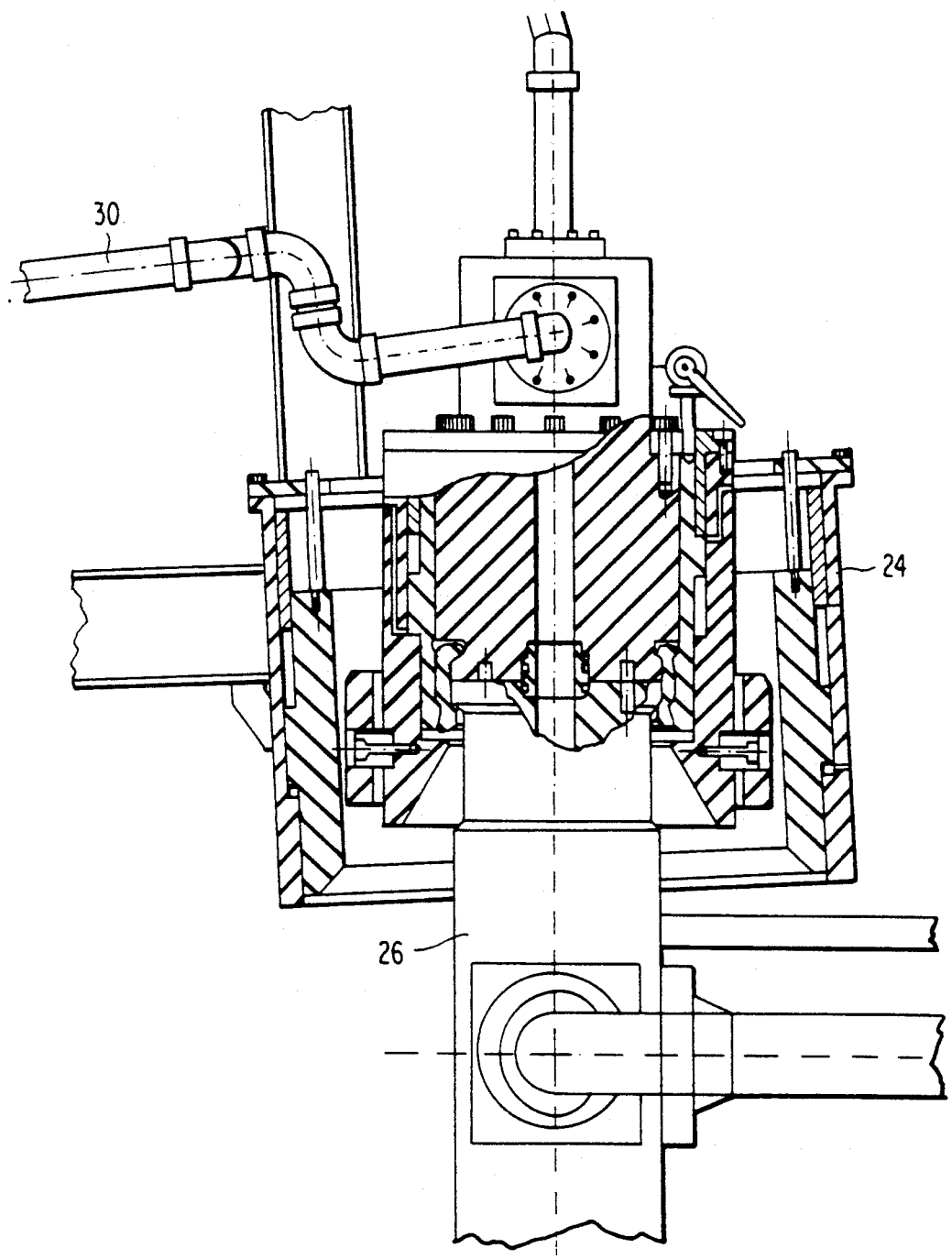

As it can be inferred from FIG. 1, a subsea module 20 is being installed by a tool 21 supported by a vessel (not shown) by means of a column 22. The subsea module 20 is provided with a main connector 23 and a lateral connector 24 for purposes of locking, respectively to the main mandrel 25 and to the lateral mandrel 26 rigidly integrated to the structures 27 and 28 set at the seabottom. The sequence of operation is described in detail as follows with its different steps being shown in FIGS. 1 through 6.

Figure 12:
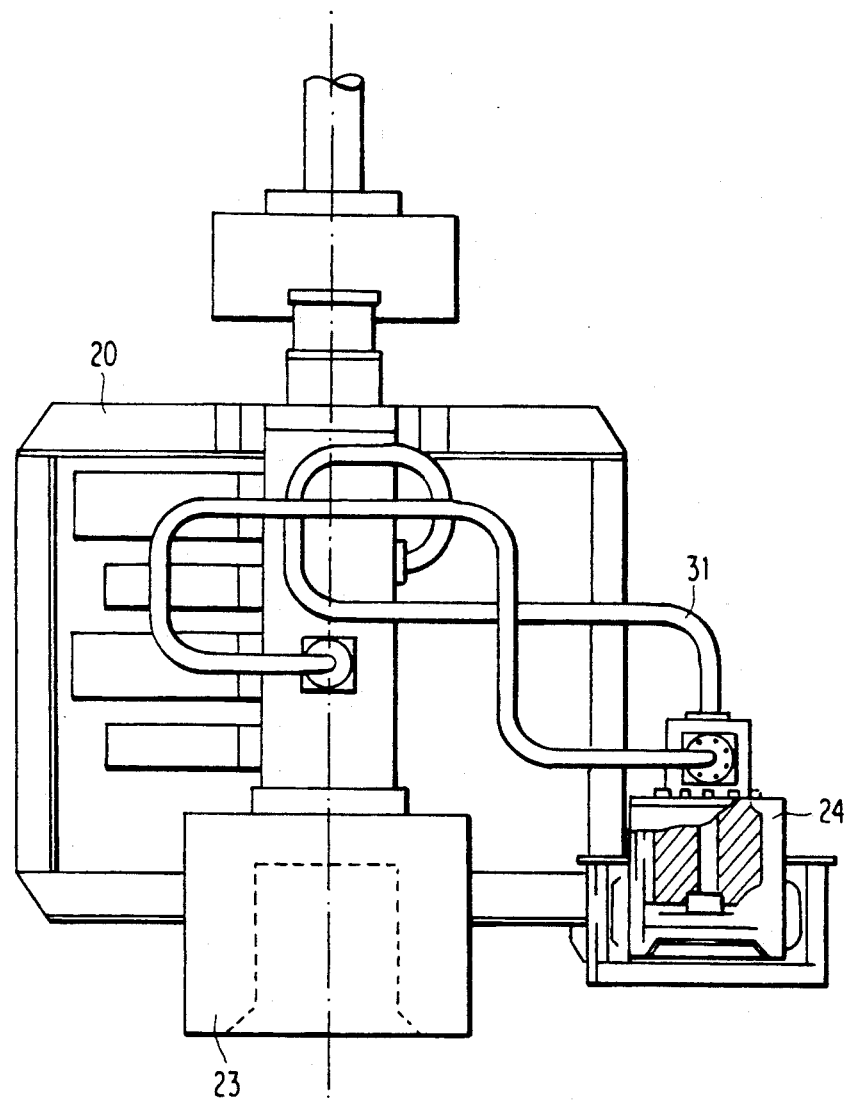
FIG. 12 is an illustrative view of a subsea module provided with pipes with structural flexibility.

During the lowering of the subsea module 20, the active (mobile) lateral connector 24 is maintained retracted and unlocked by means of hydraulic pressure originating from the tool 21. The subsea module 20 is then set onto the main mandrel 25 and the main connector 23 is locked (FIG. 2) to the main mandrel 25. In this phase, the lateral connector 24 has not enveloped the lateral mandrel 26. The lateral connector 24 is then extended upon application of hydraulic pressure originating from the tool 21 and, being forced downwards, has its tapered guide 29, FIG. 4, in contact with the lateral mandrel 26 and, due to the degrees of freedom concerning linear and rotation displacements which it has, it adjusts itself to the lateral mandrel 26, assuming its positioning. For this displacement of the active lateral connector 24 to be possible, the pipeline of the subsea module 20 must be flexible, and said flexibility may be achieved through the articulated pipeline 30 shown on FIGS. 1 through 6, or with pipes 31 provided with their own structural flexibility, as shown on FIG. 12.

After the penetration of into the lateral mandrel 26 of the active lateral connector 24, same is locked upon the application of hydraulic pressure originating from the tool 21 and, once the connection is completed, the tool 21 is disconnected from the subsea module 20 and returned to the surface. Then the subsea module 20 installed and connected to the mandrels 25 and 26, achieving the structural and fluid-flow continuity between the structures 27 and 28.

Figure 7:
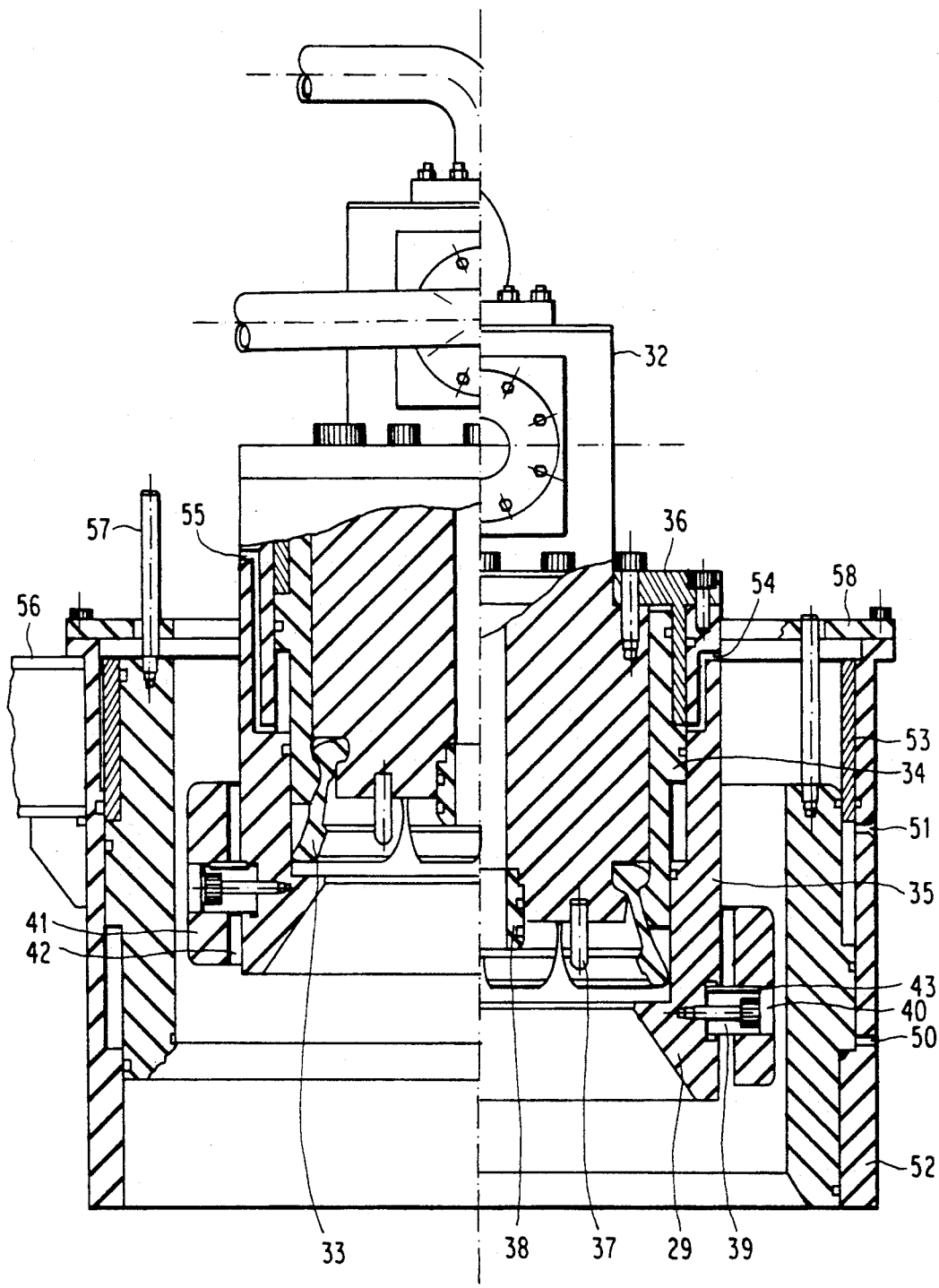
FIGS. 7 and 8 are views in longitudinal section with a 90° difference in relation to the active lateral connector.
Figure 8:
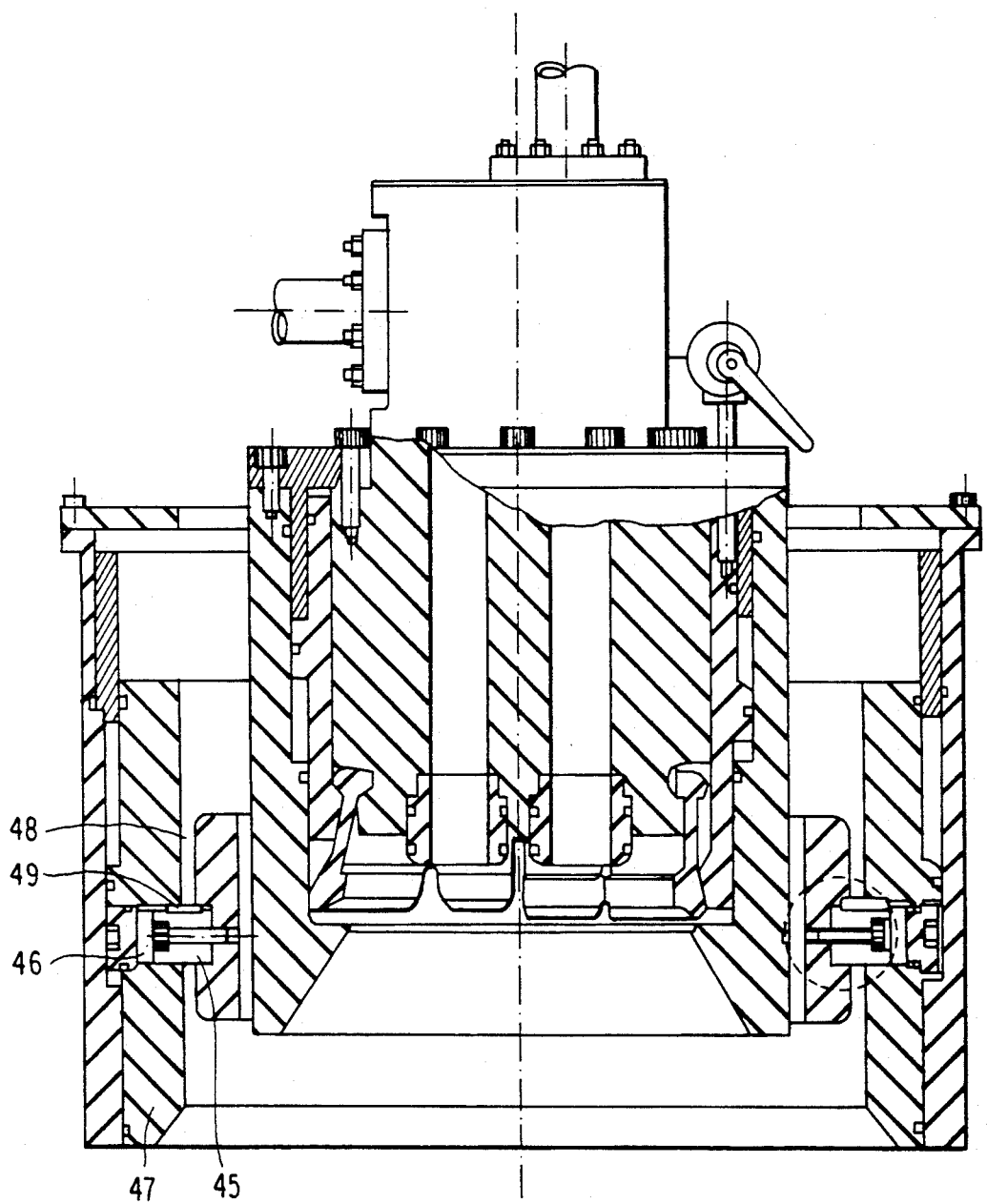
Figure 9:
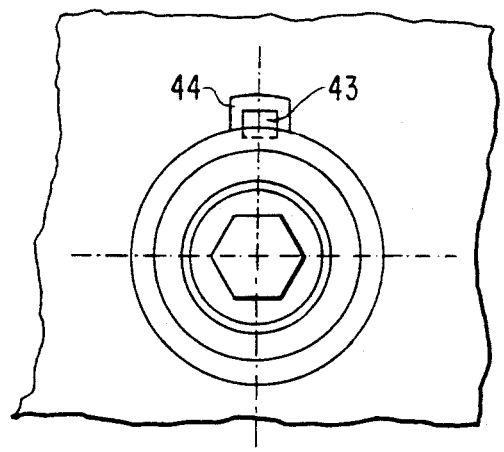
FIG. 9 is an enlarged detail plan view of the rotation-limitation key of FIG. 8.

Still according to this invention, the active lateral connector 24 utilized in the subsea connection system, represented in 90° shifted longitudinal sections at FIGS. 7 and 8, includes, in its innermost part, a locking and sealing set, FIG. 7, consisting of a body 32, chuck jaws 33, a locking ring 34, a jacket 35, a cover 36, a tapered conical guide 29, a guide pin 37 and a sealing coupling 38, said locking and sealing set being supported by two support pins 39 held up in the orifices 40 of the intermediate jacket 41, being free to displace axially along the orifices 40 utilizing the play 42 and being free to rotate in the orifices 40 with rotation limitation provided by the key 43 and by the play of the key slot 44, said key 43 and key slot 44 being shown in detail in FIG. 9.

The intermediate jacket 41 is, on its turn, supported by two pins 45, FIG. 8, arranged with a 90° angular difference in relation to the orifices 40. Such pins 45 are positioned, respectively, in the orifices 46 of the external jacket 47, being free to displace along the axis of the orifices 46 utilizing the play 48 and being free to rotate in the orifices 46, with rotation limitation provided by the key 49 and by the play of the key slot of the orifices 46, identical to that presented on FIG. 9 at 43, 44.

According to a first accomplishment of the active lateral connector 24 of this invention, the external jacket 47, FIG. 8, vertically moved upwards and downwards, upon the application of hydraulic pressure, respectively, to the pressure intakes 50 and 51, so as to achieve the retraction and the extension of the locking and sealing set. The external jacket 47 consists of an annular piston and a pressure chamber formed by the carcass or casing 52 and by a stop 53. The locking is achieved upon the application of hydraulic pressure to the pressure intake 54 which lowers the locking ring 34 which, on its turn, moves the chuck jaws 33 to the locked-connector position. The unlocking is achieved upon the application of hydraulic pressure to the pressure intake 55 which moves the locking seal 34 upwards, making the chuck jaws 33 to open, assuming the unlocked-connector position.

It must be pointed out that the carcass 52 is rigidly fastened to the subsea module 20 by means of a beam 56 (not shown) therefore, preventing any relative movement between the carcass 52 and the main connector 23. In addition, so as to prevent the external jacket 47 from rotating randomly around its axis, two alignment pins 57 fastened to the external jacket 47 pass with play through the orifices of the antirotation plate 58 fastened by means of bolts to the carcass 52.

Figure 10:
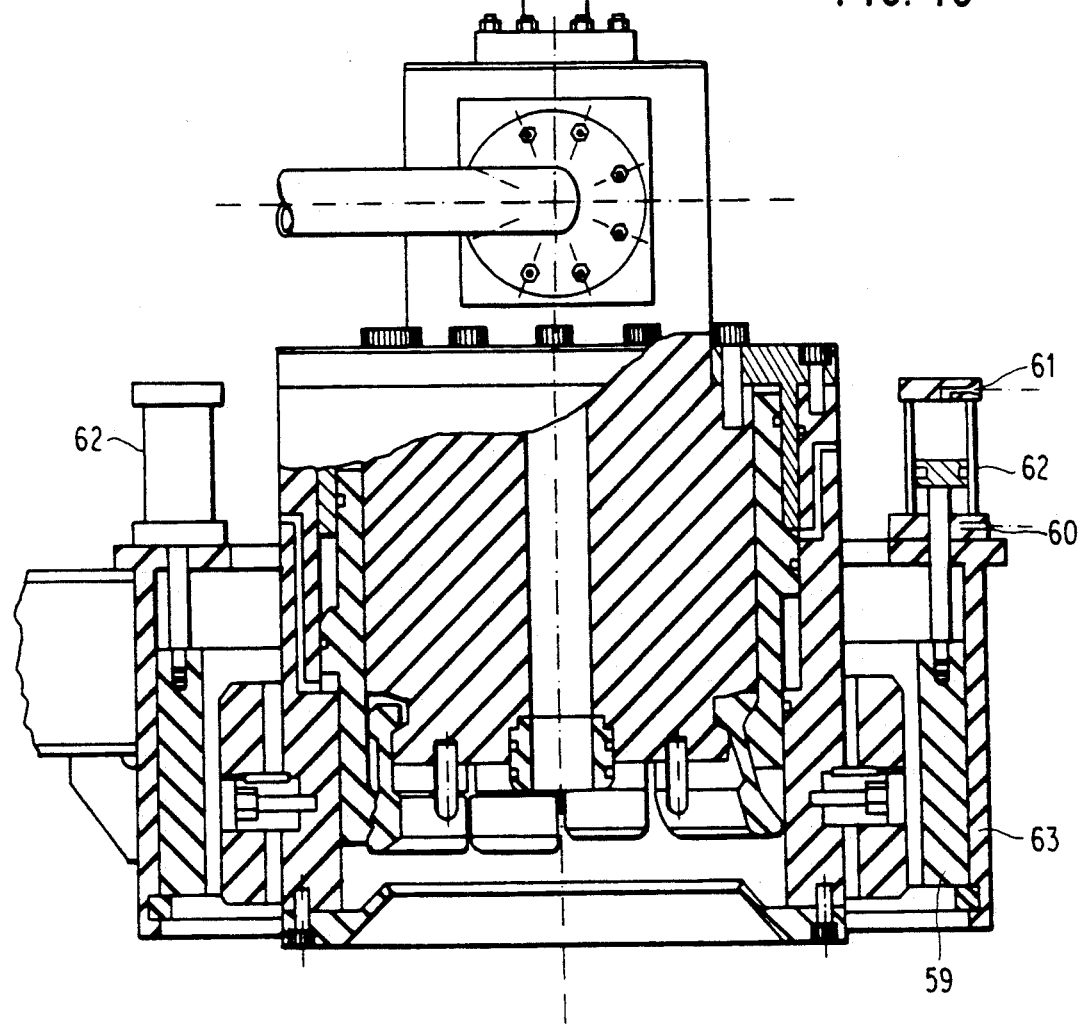
FIG. 10 is a side elevational view partially broken away, in longitudinal section, of the active lateral connector in which the upward and downward movement of the external jacket is obtained by means of hydraulic cylinders.

According to a second embodiment of the active lateral connector 24 of this invention, shown on FIG. 10, the upward and downward movement of the external jacket 59 is achieved upon the application of hydraulic pressure to the pressure in takes 60 and 61 of the hydraulic cylinders 62, fastened by means of bolts to the top of the carcass 63.

Figure 11:
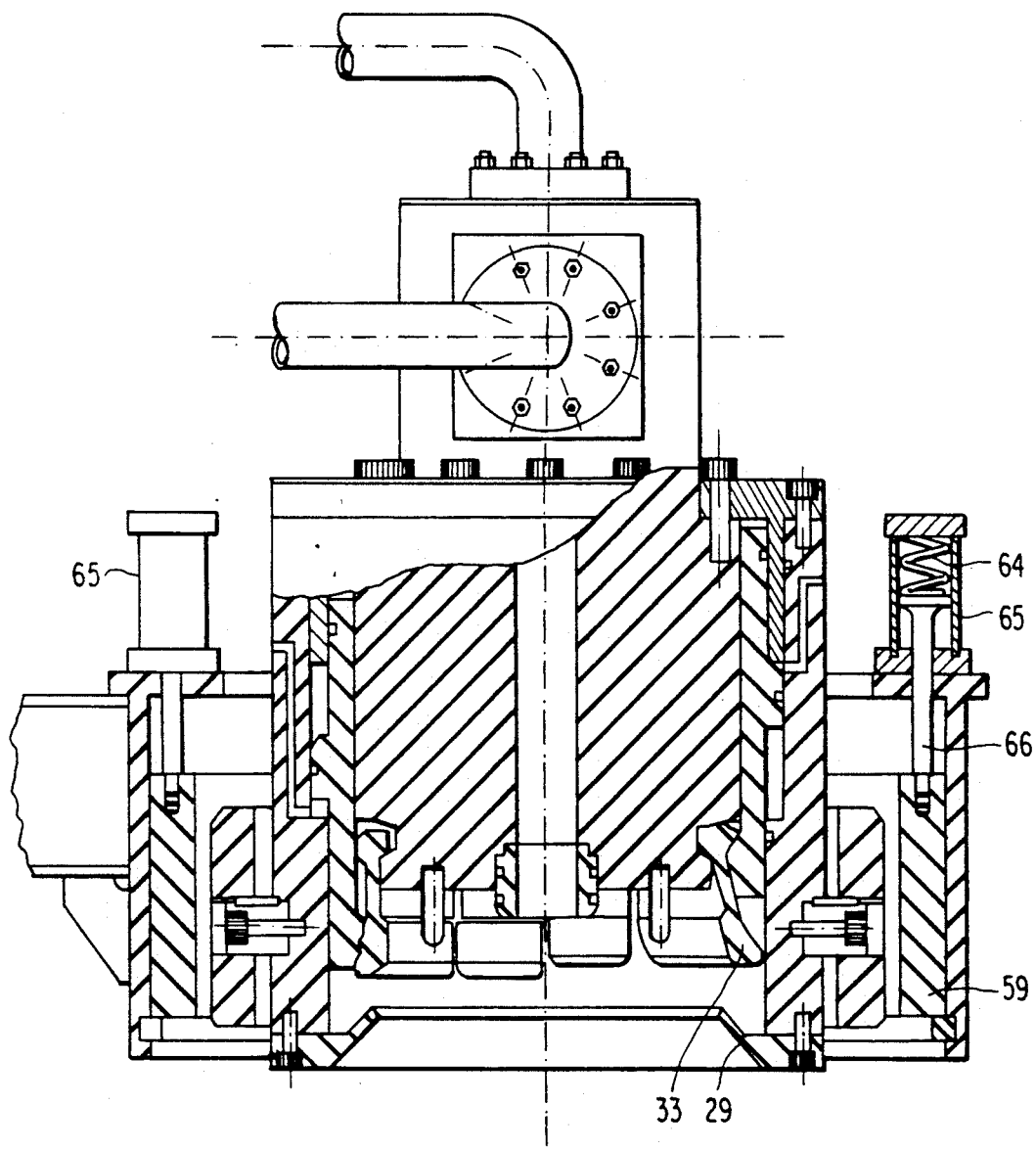
FIG. 11 is a similar view in longitudinal section to that of FIG. 10 of the active lateral connector in which the external jacket is maintained downwards by means of springs.

Still according to a third embodiment of the active lateral connector 24 of this invention, shown on FIG. 11, the external jacket 59 is maintained in its lowermost position by the constant action of the springs 64 contained in the spring cases 65 which act on the rods 66 fastened to the external jacket 59; thus, the active lateral connector 24 is always biased to its extended position. As the subsea module 20 is lowered onto the main mandrel 25, the tapered conical guide 29, acting on the lateral mandrel 26, forces the lateral connector 24 to assume the same axial alignment positioning of the lateral mandrel 26, such movement being possible due to the degrees of freedom which the lateral connector 24 has and due to the flexibility of the pipe 30 or 31, or FIG. 12. The springs 64 force the locking and sealing set downwards, towards the upper face of the lateral mandrel 26, so as to allow the lateral connector 24 to be locked to the lateral mandrel 26 through the action of the chuck jaws 33.

I claim:

1. Subsea connection system and active lateral connector utilized in said system, for the installation of subsea modules which must be respectively locked to a first, main mandrel (25) and a second, lateral mandrel (26) of respective structures (27, 28) set at the seabottom said system comprising: a rigid main vertical connector (23) and a mobile, active lateral connector (24) coupled to a subsea module (20), and means for connection of said rigid main vertical connector (23) and said mobile, active lateral connector (24), respectively, to said first, main mandrel (25) and said second, lateral mandrel (26) rigidly attached, respectively, to said structures (27, 28) set at the seabottom.

2. Subsea connection system and active lateral connector utilized in said system according to claim 1, wherein said mobile active lateral connector (24) comprises a locking and sealing set consisting of a body (32), chuck jaws (33), a locking ring (34), a jacket (35), an intermediate jacket (41), an external jacket (47), a cover (36), a conical tapered guide (29), a guide pin (37), a sealing coupling (38), and supporting means (39), said supporting means being within orifices (40) of the intermediate jacket (41) and said system further comprising supporting means (45) of said intermediate jacket (41) arranged 90° circumferentially offset from said orifices (40), and within orifices (46) of said external jacket (47).

3. Subsea connection system and active lateral connector utilized in said system according to claim 2, further comprising means mounting said intermediate jacket (41) for displacement axially along said orifices (40) and for rotation of said intermediate jacket in said orifices (40), and means for limiting rotation of said intermediate jacket including a key (43) and a key slot (44) receiving said key and providing play between said key and said key slot.

4. Subsea connection system and active lateral connector utilized in said system according to claim 2, further comprising means for mounting said external jacket (47) for displacement along the axis of the orifices (46), at right angles to the axis of the external jacket, and for rotation of said external jacket in said orifices (46), and means for limiting said rotation of said external jacket comprising a key (49) and a key slot of said orifices (46).

5. Subsea connection system and active lateral connector utilized in said system according to claim 2, further comprising means for moving said external jacket (47) axially vertically upwards and downwards, first pressure intakes (50, 51), and second pressure intakes (54, 55), means responsive to application of hydraulic pressure to said pressure intakes (50, 51) for retraction and extension of said locking sealing set, whereby a locking effect is achieved upon application of hydraulic pressure to one (54) of said second pressure intakes causing lowering of the locking ring (34) to move the chuck jaws (34) to a locked-connector position, and an unlocking effect is achieved upon application of hydraulic pressure to another (55) of said second pressure intakes effecting movement of said locking ring (34) vertically upwards thereby opening said chuck jaws (33) to an unlocked-connector position.

6. Subsea connection system and active lateral connector utilized in said system according to claim 5, wherein said external jacket (47) constitutes an annular piston, and a pressure chamber is formed by a carcass (52) and a stop (53).

7. Subsea connection system and active lateral connector utilized in said system according to claim 5, wherein said means for moving said external jacket (59) axially comprises pressure intakes (60, 61) of hydraulic cylinders (62) fastened to a top of the carcass (63), and means for applying hydraulic pressure to said pressure intakes (60, 61).

8. Subsea connection system and active lateral connector utilized in said system according to claim 2, further comprising spring (64) contained in spring cases (65) and acting on rods (66) fastened to said external jacket (59) for biasing said external jacket (59) to a lowermost position, thereby tending to maintain the connector always in an extended position.

9. Subsea connection system and active lateral connector utilized in said system according to claim 8, wherein said springs (64) force said locking and sealing set downwards, towards an upper face of said lateral mandrel (26), and said lateral connector (24) locked to said lateral mandrel (26) through the action of said chuck jaws (33).

* * * * *